United States Patent
Yodaiken (10) Patent No.: US 8,375,448 B2
(45) Date of Patent: *Feb. 12, 2013

(54) SYSTEMS AND METHODS FOR DETECTING A SECURITY BREACH IN A COMPUTER SYSTEM

(75) Inventor: Victor J. Yodaiken, Socorro, NM (US)

(73) Assignee: Intellectual Ventures Fund 73 LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/224,235

(22) Filed: Sep. 1, 2011

(65) Prior Publication Data

US 2012/0066766 A1  Mar. 15, 2012

Related U.S. Application Data (63) Continuation of application No. 12/511,520, filed on Jul. 29, 2009, now Pat. No. 8,032,936, which is a continuation of application No. 10/733,469, filed on Dec. 12, 2003, now Pat. No. 7,587,763.

(60) Provisional application No. 60/432,655, filed on Dec. 12, 2002.

(51) Int. Cl.
*G06F 11/00* (2006.01)

(52) U.S. Cl. ............. 726/23; 726/26; 709/224; 709/225

(58) Field of Classification Search .............. 726/22–23, 726/25, 26; 713/160, 188; 709/224, 25, 709/225

See application file for complete search history.

(56) References Cited

U.S. PATENT DOCUMENTS

| 5,345,587 | A | 9/1994 | Fehskens et al. |
| 5,469,571 | A | 11/1995 | Bunnell |
| 5,504,814 | A | 4/1996 | Miyahara |
| 5,530,758 | A | 6/1996 | Marino, Jr. et al. |
| 5,721,922 | A | 2/1998 | Dingwall |
| 5,903,752 | A | 5/1999 | Dingwall et al. |
| 5,911,065 | A | 6/1999 | Williams et al. |
| 5,958,010 | A | 9/1999 | Agarwal et al. |
| 5,987,621 | A | 11/1999 | Duso et al. |
| 5,995,745 | A | 11/1999 | Yodaiken |
| 6,061,709 | A | 5/2000 | Bronte |
| 6,125,390 | A | 9/2000 | Touboul |

(Continued)

FOREIGN PATENT DOCUMENTS

| EP | 1055990 | 11/2000 |
| WO | WO-9804967 | 2/1998 |

(Continued)

OTHER PUBLICATIONS

REDSonic, Inc, http://web.archive.org/web/20021029234300/http://www.redsonic.com/en/products/RealTime.htm, pp. 1-4, Copyright 2002.*

(Continued)

*Primary Examiner* — Kim Vu
*Assistant Examiner* — Suman Debnath
(74) *Attorney, Agent, or Firm* — Perkins Coie LLP (57) ABSTRACT

The present invention provides systems and methods for applying hard-real-time capabilities in software to software security. For example, the systems and methods of the present invention allow a programmer to attach a periodic integrity check to an application so that an attack on the application would need to succeed completely within a narrow and unpredictable time window in order to remain undetected.

18 Claims, 5 Drawing Sheets

U.S. PATENT DOCUMENTS

| | | | |
|---|---|---|---|
| 6,137,862 | A | 10/2000 | Atkinson et al. |
| 6,144,739 | A | 11/2000 | Witt et al. |
| 6,157,959 | A | 12/2000 | Bonham et al. |
| 6,243,753 | B1 | 6/2001 | Machin et al. |
| 6,330,670 | B1 | 12/2001 | England et al. |
| 6,377,994 | B1 | 4/2002 | Ault et al. |
| 6,385,643 | B1 | 5/2002 | Jacobs et al. |
| 6,640,242 | B1 * | 10/2003 | O'Neal et al. ............... 709/206 |
| 6,658,465 | B1 | 12/2003 | Touboul |
| 6,961,765 | B2 | 11/2005 | Terry |
| 7,003,691 | B2 | 2/2006 | Safford et al. |
| 7,152,242 | B2 * | 12/2006 | Douglas ........................ 726/23 |
| 7,398,389 | B2 | 7/2008 | Teal et al. |
| 7,587,763 | B2 | 9/2009 | Yodaiken |
| 7,673,137 | B2 | 3/2010 | Satterlee et al. |
| 8,032,936 | B2 | 10/2011 | Yodaiken |
| 2001/0044904 | A1 | 11/2001 | Berg et al. |

FOREIGN PATENT DOCUMENTS

| | | |
|---|---|---|
| WO | WO-0217048 | 2/2002 |
| WO | WO-2004/055634 | 7/2004 |

OTHER PUBLICATIONS

Bollella, Gregory, et al., "Support for Real-time Computing Within General Purpose Operating Systems", Proceedings of the IEEE Real-Time Technology and Applications Symposium, May 1995, pp. 4-14.

Redsonic, Inc. www.redsonic.com/en/products/RealTime.htm., pp. 1-4, Copyright 2002.

Karger, Paul A., "A Retrospective on the VAX VMM Security Kernel", IEEE Transactions on Software Engineering, Nov. 1991, pp. 1147-1165, vol. 17, No. 11.

eSecuityPlanet.com "An Online Security Spotlight: Tripwire Tutorial", www.esecurityplanet.com/prodser/article.php/3105481, Nov. 16, 2003, 4 pp.

International Search Report, PCT Application PCT/US03/39503, mailed Apr. 7, 2005, 2 pp.

Canadian Intellectual Property Office, Canadian Office Action, CA Application 2,509,579, mailed Oct. 5, 2009, 4 pp.

European Patent Office, Supplementary European Search Report, EP Application 03813381.5, mailed Jan. 29, 2010, 3 pp.

United States Patent and Trademark Office, Non-Final Office Action, U.S. Appl. No. 10/733,469, mailed Jun. 20, 2007, 26 pp.

United States Patent and Trademark Office, Final Office Action, U.S. Appl. No. 10/733,469, mailed Dec. 14, 2007, 27 pp.

United States Patent and Trademark Office, Non-Final Office Action, U.S. Appl. No. 10/733,469, mailed Aug. 8, 2008, 24 pp.

United States Patent and Trademark Office, Interview Summary, U.S. Appl. No. 10/733,469, mailed Jan. 8, 2009, 2 pp.

United States Patent and Trademark Office, Notice of Allowance, U.S. Appl. No. 10/733,469, mailed May 4, 2009, 14 pp.

United States Patent and Trademark Office, Non-Final Office Action, U.S. Appl. No. 12/511,520, mailed Oct. 4, 2010, 30 pp.

United States Patent and Trademark Office, Notice of Allowance, U.S. Appl. No. 12/511,520, mailed Jun. 1, 2011, 7 pp.

* cited by examiner

SYSTEMS AND METHODS FOR DETECTING A SECURITY BREACH IN A COMPUTER SYSTEM

The present application claims the benefit of U.S. Provisional Patent Application No. 60/432,655, filed on Dec. 12, 2002, the entire contents of which are incorporated herein by this reference.

BACKGROUND OF THE INVENTION

1. Field of the Invention

The present invention relates to systems and methods for detecting a security breach in a computer system.

2. Discussion of the Background

Standard methods for computer system security include passwords and other authorization tokens, use of encryption, and permission checking systems. In such standard methods, "security markers" (e.g., checksums, digital signatures, and permission levels) and "security properties" (e.g., an exact match between a data item that is supposed to be immutable and a hidden copy of that data item) can be used to validate the integrity of data and of the security system. However, all methods have flaws and costs. In practice, no security system is 100% effective.

The "defense in depth" concept of computer system security provides a series of barriers and counter-checks to decrease the probability of a successful compromise and to increase the probability of early detection that can lead to some reaction—such as a system halt, safe-restart, or a counter-measure against the attacker.

The more complex a security system is, the greater the difficulty in validating the implementation and design and the higher the cost in terms of computing resources and the engineering investment needed to construct and maintain the system. Different applications can realistically support different levels of security costs. For example, software controlling remote power transmission equipment is severely cost and resource constrained.

What is needed are system and methods for improving security that do not impose unrealistic costs and that can be scaled to different applications.

SUMMARY OF THE INVENTION

The present invention provides systems and methods for applying hard-real-time capabilities in software to software security. For example, the systems and methods of the present invention allow a programmer to attach a periodic integrity check to an application so that an attack on the application would need to succeed completely within a narrow and unpredictable time window in order to remain undetected.

Advantageously, the present invention can be adapted to a wide range of applications and computer environments. One area of intended application is in process control systems where a number of relatively small, low-cost, control devices are used to control the operation of a factory or power transmission system or warehouse and these devices may be connected by a network and where there may be real-time requirements on the correct operation of the devices. A second intended application is for computer clusters where component computers can be used to monitor the security of the other members of the cluster and where there are resources for significant cross check of security between software utilizing the present invention and traditional security software. A third intended application is for computers containing sensitive data that can be equipped with a simple test device that can communicate with software utilizing the invention to check the integrity of the application. A fourth intended application is for point-of-sale terminals where customer input of credit card or other sensitive information must be protected against snooping. This list of intended application is not meant to be exhaustive; other applications of the present invention are contemplated.

In one embodiment, the present invention provides a security system for a computer system. The security system periodically, in hard real-time, checks the integrity of the computer system and/or applications running on the computer system by examining critical data structures maintained by the application code and/or the computer system and by examining the application code itself. The security system includes the following components: (1) a high priority, periodic, real-time security process or thread for (a) checking the integrity of the application code and the application's critical data structures, (b) checking the execution scheduling of the application, (c) raising an alarm in case of failure, and (d) if necessary, preempting the application, and (2) a process or routine that can atomically update an encrypted checksum and its associated data structure. The security process will raise an alarm if it finds that the application code has been tampered with, if it finds that critical data structures do not have matching checksums, or if it detects that the application is not being scheduled at the required frequency.

Advantageously, the security system may further include a challenge handler and an external monitor. The external monitor may be an application running on peer computer system that is connected to the computer system by a network or it may be a security device within the computer system. The external monitor is configured to issue challenges to the challenge handler. The external monitor expects to receive from the challenge hander a response to the challenge within a predetermined time limit. If the challenge handler does not respond to the challenge within the predetermined time limit, then this is indication that the computer system may be compromised.

For example, suppose that the security thread is configured to update an encrypted data item with a sequence number indicating how many cycles have passed without detection of an intruder. The external monitor can be configured to request that these data items be transmitted to the monitor using an encryption key included in the challenge sent to the challenge handler. Additionally, the monitor may require that a response to the challenge be returned within 1 millisecond. Any attacker who is not aware of this real-time challenge/response feature will not be able to produce an undetected compromise of the computer system if the integrity markers and properties have been properly selected. Moreover, an attacker who is aware of the real-time challenge/response feature must gain kernel level privileges to attack the real-time security thread while preserving the timing of the response.

In another embodiment, the present invention provides a security system for a computer system running a dual-kernel operating system having a real-time kernel and a non-real time or "general-purpose" kernel. The security system includes the following components: (1) a first real-time thread executing under the real-time kernel for checking a configurable set of integrity markers and properties of the general-purpose kernel, (2) a second real-time thread executing under the real-time kernel for checking integrity markers of the real-time kernel and the first real-time thread, (3) one or more challenge handlers executing under the real-time kernel that provide "challenge/response" functionality when challenges are received from an external monitor, as described above, and (4) a security module executing under the general-purpose kernel that checks the integrity markers and properties of the real-time kernel and the first and second real-time threads.

In this embodiment, integrity markers checked by the first real-time thread might include (1) a checksum/digital signature on a data structure containing information about a password file used by the general-purpose kernel (such as an inode in a UNIX type environment) and (2) a checksum/digital signature on a software application running under the general-purpose kernel that is used to encrypt and decrypt passwords stored in the password file. Integrity properties checked by the first thread might include whether key applications (e.g., a web server program or a data base) had been restarted since normal operation began and whether all of these applications appear to be getting scheduled reasonably.

The challenge handler, which provide the challenge/response functionality, permit an external monitor to issue a challenge, to which the return, within a specified time limit, of an encrypted data item containing validation information is required.

For example, suppose that the first two threads each update an encrypted data item with a sequence number indicating how many cycles have passed without detection of an error. An external monitor might request that these data items be transmitted to the monitor using an encryption key passed with the challenge. Additionally, the network peer might require that the response be returned within 1 millisecond. As mentioned above, any attacker who is not aware of this real-time challenge/response feature will not be able to produce an undetected compromise of the computer system if the integrity markers and properties have been properly selected. Additionally, an attacker who is aware of the real-time challenge/response feature must gain kernel level privileges to attack the real-time threads, and, in order to do that, the attacker must compromise the security components of the general purpose kernel and then defeat the three real-time threads before any one of them detects a compromise.

Keeping the exact periods of these components and the selection of integrity markers and properties secret (for example, by determining them at system boot) further complicates the task of the attacker. An attack that starts from the general purpose kernel or its application is further handicapped by the nature of the separation of the real-time and general purpose kernels in that it cannot be sure of completing an action within any precise time interval. An attack that starts at the real-time kernel side is handicapped by the simpler nature of the real-time kernel, which permits a greater degree of security validation during design and implementation, and by the operation of the security module which checks the integrity of the real-time kernel and the real-time security threads.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENT

In the following description, for purposes of explanation and not limitation, specific details are set forth, such as particular systems, computers, devices, components, techniques, computer languages, storage techniques, software products and systems, operating systems, interfaces, hardware, etc. in order to provide a thorough understanding of the present invention. However, it will be apparent to one skilled in the art that the present invention may be practiced in other embodiments that depart from these specific details. Detailed descriptions of well-known systems, computers, devices, components, techniques, computer languages, storage techniques, software products and systems, operating systems, interfaces, and hardware are omitted so as not to obscure the description of the present invention.

Figure 1:
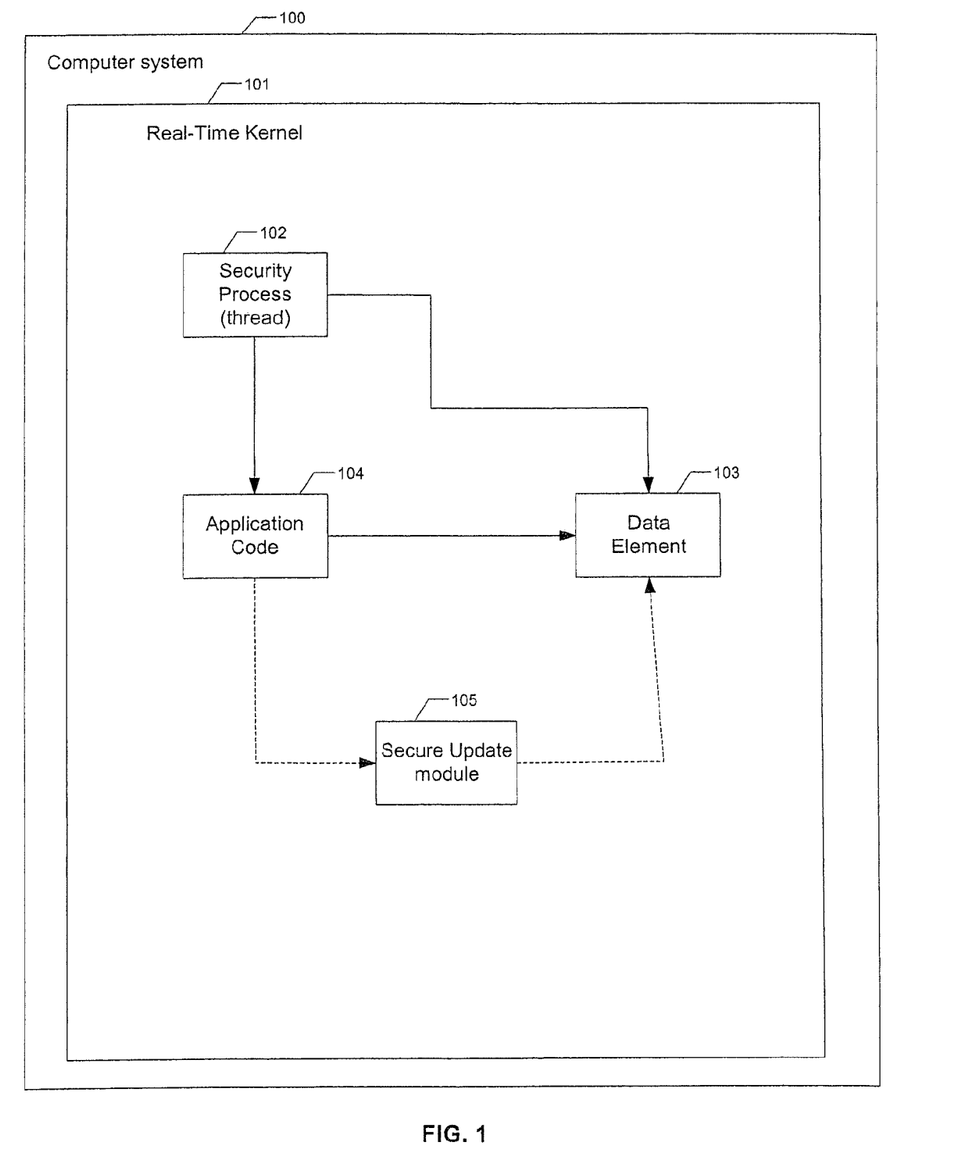
FIG. 1 is a functional block diagram of a computer system having a hard real-time operating system and a security system running under the real-time operating system.

FIG. 1 is a functional block diagram of a real-time computer system 100 having a hard real-time operating system 101. In some embodiments, hard, real-time operation system 101 is the RTLinuxPro operating system available from FSM-Labs of Socorro, N. Mex. However, other hard, real-time operating systems can be used. Computer system 100 includes a process or thread 102 (hereafter "security process 102") for detecting whether application code 104 and/or a critical data element (e.g., files, data-structures, etc.) 103 have been compromised by an intruder.

In some embodiments, security process 102 determines whether application code 104 has been compromised (e.g., modified by an intruder) by (1) determining whether the code 104 has been modified unauthorizedly and/or (2) determining whether the application code 104 is executing according to a pre-determined schedule. There are a number of ways that security process 102 can determine whether code 104 has been modified unauthorizedly. For example, it could determine whether the code 104 matches a checksum associated with the code 104. Additionally, it could have access to a past copy of code 104 and compare the past copy of the code to the current code to see if there has been any modification since the past copy was created. Other methods exist for determining whether code 104 has been modified unauthorizedly and the invention is not limited to a particular method.

Similarly, security process 102 may determine whether data element 103 has been compromised by determining whether the data element has been modified by an unauthorized individual or process. There are a number of ways that security process 102 can determine whether code 104 has been modified unauthorizedly. For example, it could determine whether the code 104 matches a checksum associated with the data element 103.

In embodiments where a checksum is utilized to determine whether data element 103 has been compromised, the first time data element 103 is created and stored a checksum for the data element is also created and stored (preferably, the stored checksum is encrypted). Additionally, whenever application code 104 needs to make a change to data element 103, application code 104 itself or a secure update process 105 in communication with application code 104 updates the data element and the checksum associated with data element 103 so that checksum will match the modified data element 103. Preferably, the update of the data element 103 and its checksum is done atomically (for example, by using well known methods of updating a copy, computing the checksum, and changing a pointer or index atomically).

Because of the checks performed by security process 102, in order for an intruder to compromise data element 103 or code 104 without detection, the intruder must have knowledge of the algorithm used to create the checksum. Additionally, in the embodiments where the checksum is encrypted, the intruder must encrypt the checksum using the appropriate algorithm and the appropriate key.

Figure 2:
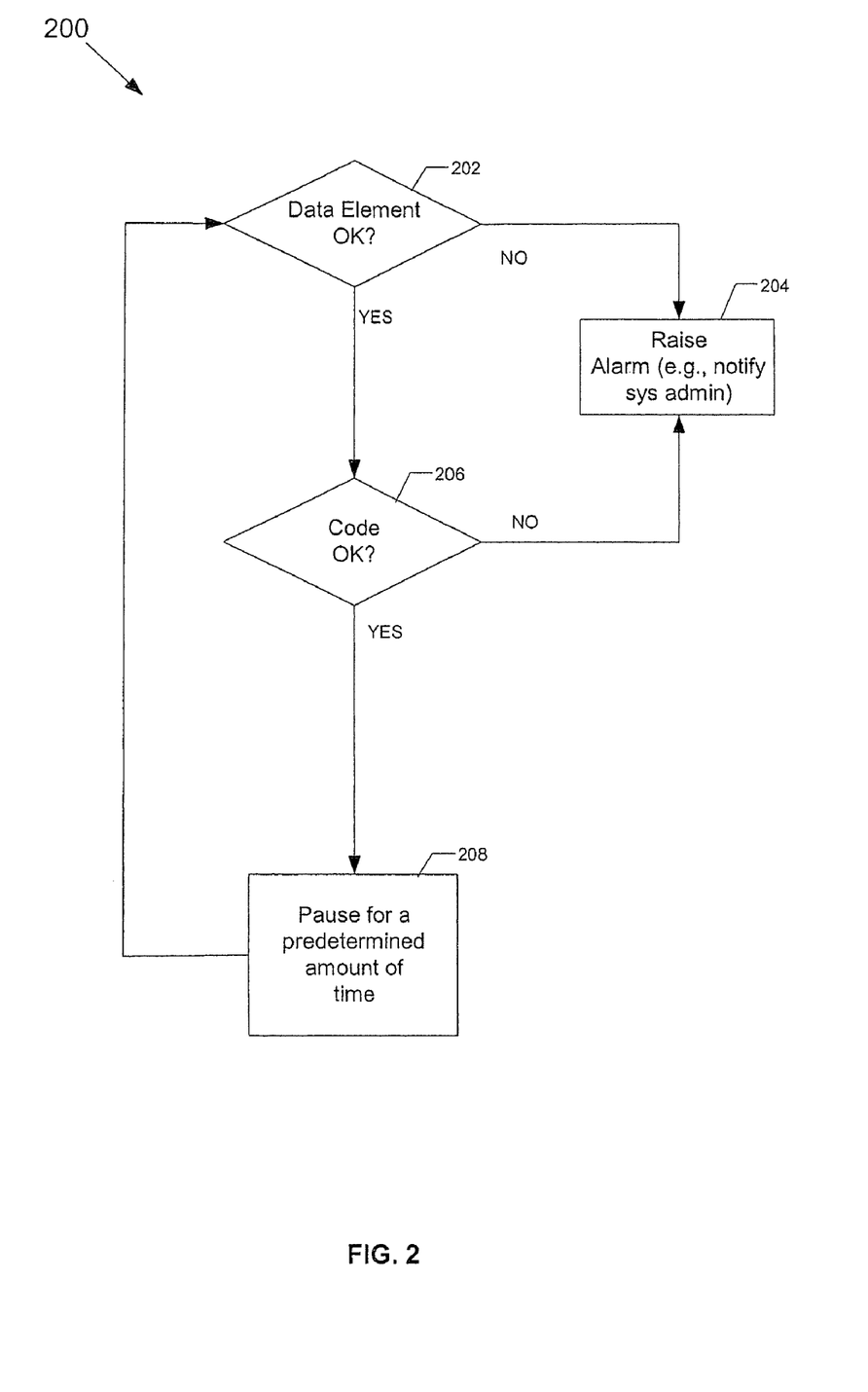
FIG. 2 is a flow chart illustrating a process according to an embodiment of the invention.

Advantageously, in some embodiments, security process 102 and/or real-time operating system 101 is/are configured so that security process 102 executes as a high-priority task within operating system 101. This will enable security process 102 to perform the required security checks at "precise," regular intervals of time. This feature is illustrated in FIG. 2, which is a flow chart illustrating a process 200 performed by security process 102.

Process 200 may begin in step 202, where security process 102 determines whether data element 103 has been tampered with by an intruder (e.g., modified unauthorizedly). If it has, process 202 continues to step 204, otherwise process 200 continues to step 206. In step 204, security process 102 raises an alarm and/or shuts-down application process 108. In step 206, security process 102 determines whether code 104 has been tampered with. If it has, process 202 proceeds to step 204, otherwise process 200 continues to step 208. In step 208, security process 102 pauses for a pre-determined amount. After step 208, process 200 proceeds back to step 202. Because security process 102 is a high-priority task within real-time operating system 101, it is almost guaranteed that security process 102 will perform steps 202-206 at deterministic intervals determined by the pause time in step 208.

The hard, real-time feature of sp102 is important in situations where application code 104 when executed periodically performs an important task and the consequences of it not performing this important task in an intended manner could be dire. Thus, security process 102, which has the ability to shut down code 104 before it is scheduled to perform the important task when there is an indication that code 104 has been tampered with, is highly valued.

As a specific example, assume that code 104 is configured to output a pre-determined signal at time t=1, t=2, etc. In this example, security process 102 can be configured to check the integrity of code 104 just before code 104 is scheduled to output the signal (e.g., sp102 can be configured to check the code's integrity at time t=0.9, t=1.9, t=2.9, . . . ). In this manner, if an intruder manages to tamper with code 104 the consequences can be minimized because sp102 will detect, in the vast majority of cases, the tampering prior to the tampered with code 104 performing its task, and, thus, be able take some form of corrective action before the tampered with code 104 is scheduled to perform its task.

Figure 3:
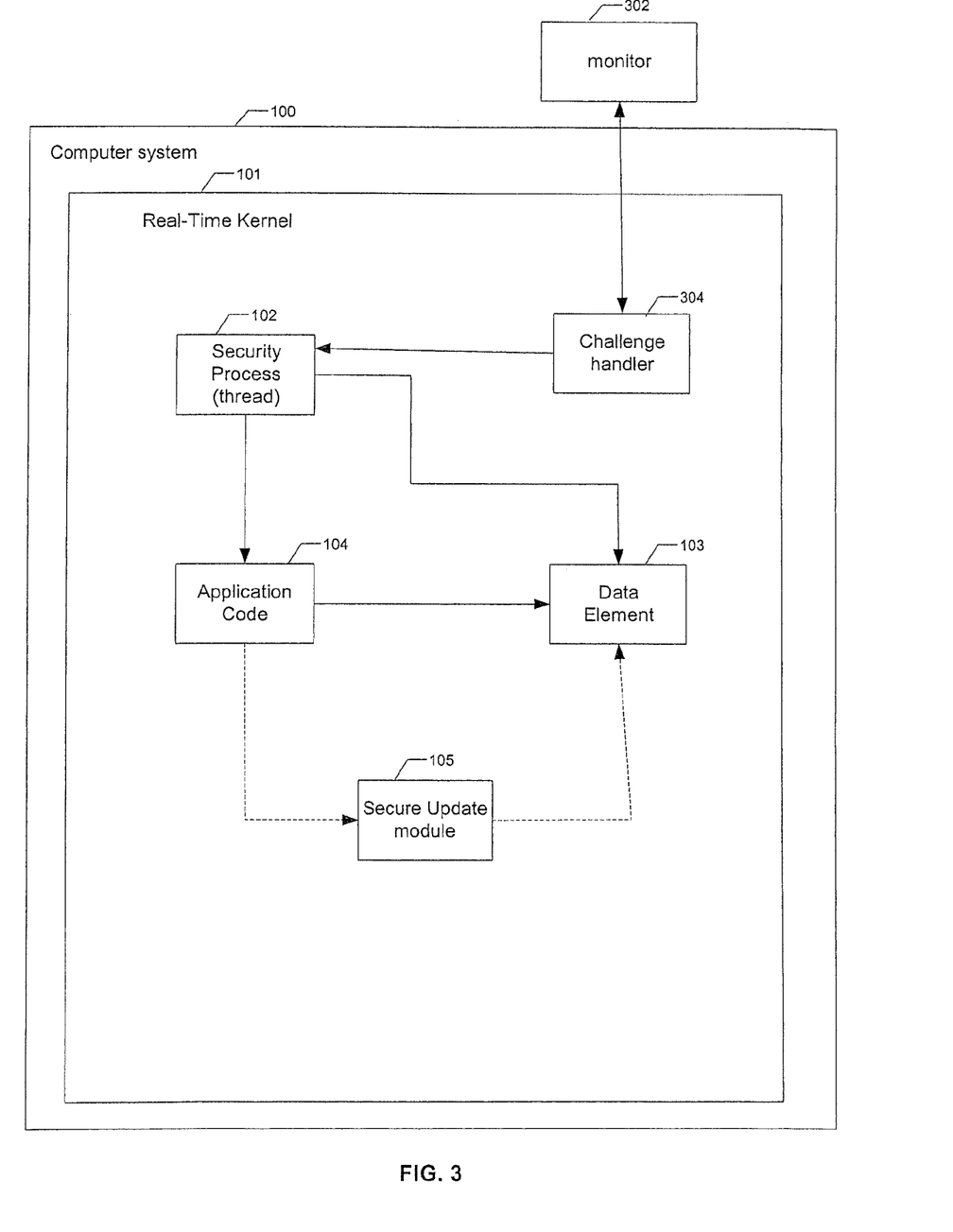
FIG. 3 illustrates a computer system according to another embodiment of the invention.

FIG. 3 illustrates a computer system 300 according to another embodiment of the invention. System 300 is similar to the system shown in FIG. 1, with the exception that system 300 further includes a external monitor 302 that can be configured to issue challenges to a challenge handler 304, which can be configured to respond to the challenges issued by monitor 302. Although challenge handler is shown as being a separate process from security process 102, this is not a limitation, as the challenge handler may be implemented as part of security process 102.

In one embodiment, the external monitor 302 is configured to present a challenge to the challenge handler 304. The challenge may be a request for basic security information or it may contain some information about which integrity constraints and integrity properties to check. The challenge may also contain a request that a response to the challenge be transmitted at a certain point in time. In one embodiment, as soon as the challenge handler 304 receives the challenge, the challenge handler validates system security by checking integrity constraints and integrity properties. For example, this may involve examining the function of standard security components such as encryption code and password files and/or examining whether critical applications are being scheduled correctly. In all embodiments, the challenge handler 304 is configured to present a response to the external monitor 302 when the monitor 302 issues a challenge. An example of a response is a properly signed and encrypted sequence number indicating which challenge is being responded to.

If the external monitor 302 does not receive a correct response from the challenge handler 304 t the appropriate time (e.g., within a specified hard time limit or at the time specified in the challenge), then external monitor 302 may declare that system 300 has been compromised. Thus, to produce an undetected compromise an attacker must not only defeat internal security, but also take over the operation of the challenge handler component 304 before expiration of the hard time limit imposed by the monitor 302.

External monitor 302 may be implemented on a computer connected to the system 300 by a deterministic network (where the time for a message to get from the monitor 302 to the secured system 300 and back is known) or it may be a specialized device within the system 300. In the second case, the monitor 302 may be a peripheral device or even an on-chip security monitor.

In other embodiments, handler 304 may be configured to transmit a validation certificate to monitor 302 according to a precise schedule, which is preferably an unpredictable schedule. For example, in embodiments where handler 304 is part of security process 102, handler 304 may be configured to transmit to monitor 302 a validation certificate according to a predetermined schedule (e.g., every 10 milliseconds), regardless of whether monitor 302 has issued a challenge. In this way, monitor 302 will determine that there is a problem with system 100 if it does not receive a validation certificate at the scheduled time. Similarly, in embodiments where handler 304 is a separate process from security process 102, handler 304 may be configured to validate the integrity of security process 102 on a scheduled basis and then transmit to monitor 302 a validation certificate if handler 304 validates the integrity of security process 102.

Figure 4:
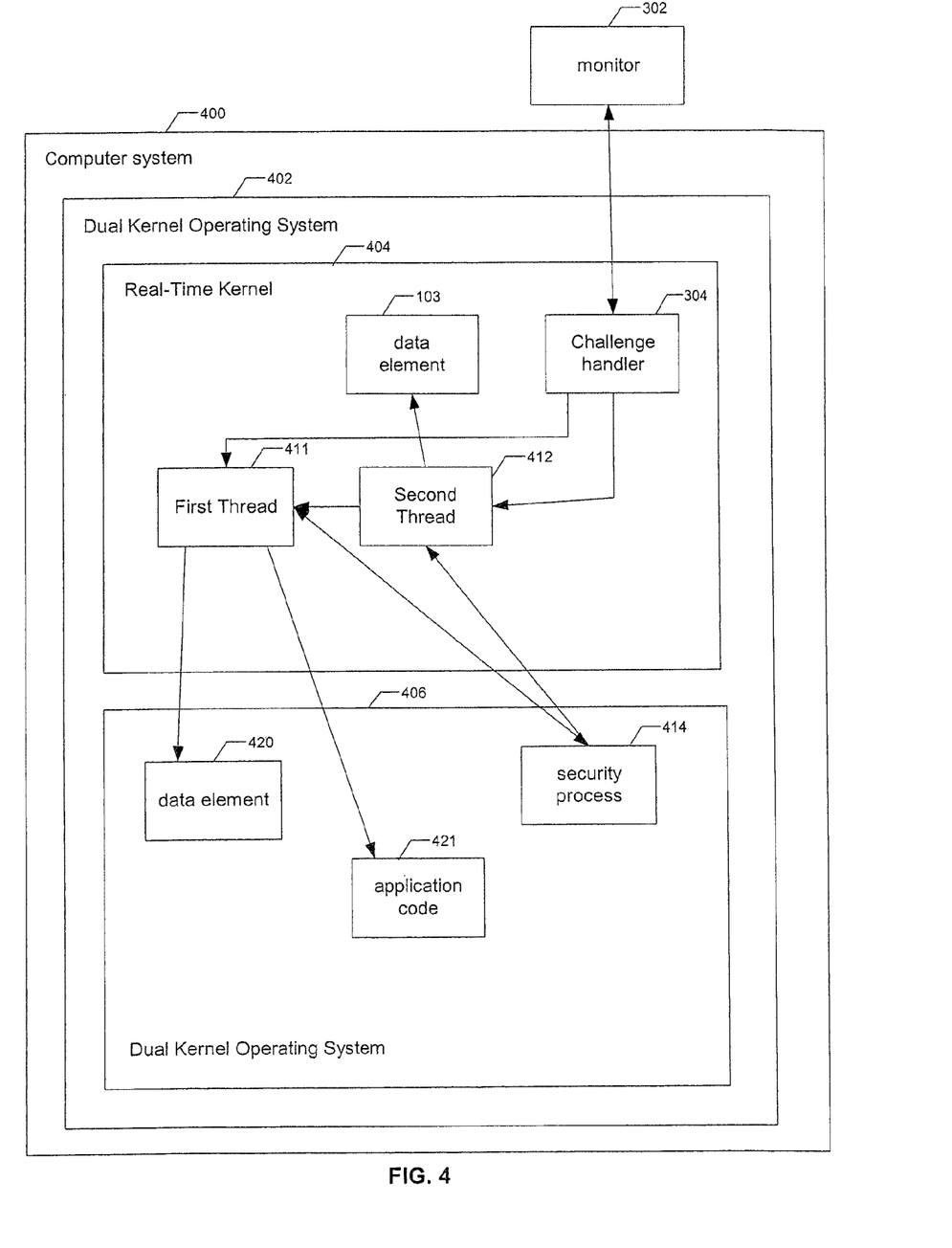
FIG. 4 illustrates another embodiment of a security system of the present invention.

FIG. 4 illustrates another embodiment of a security system of the present invention. More specifically, FIG. 4 is a functional block diagram of a computer system 400 running a dual-kernel operating system 402 having a real-time kernel 404 and a non-real-time or "general-purpose" kernel 406. The security system includes the following components: (1) a first real-time thread 411 executing under the real-time kernel for checking a configurable set of integrity markers and properties of the general-purpose kernel 406, (2) a second real-time thread 412 executing under the real-time kernel for checking integrity markers of the real-time kernel 404 and the first real-time thread 411, (3) at least one challenge handler 304 executing under the real-time kernel that provides "challenge/response" functionality when challenges are received from an external monitor 302, and (4) a security module 414 executing under the general-purpose kernel that checks integrity markers and properties of the real-time kernel 404 and the first and second real-time threads 411-412.

In this embodiment, integrity markers checked by the first real-time thread might include (1) a checksum/digital signature on a data element 420 maintaining information about a password file used by the general-purpose kernel (such as an inode in a UNIX type environment) and (2) a checksum/digital signature on a software application 421 running under the general-purpose kernel 406 that is used to encrypt and decrypt passwords stored in the password file. Integrity properties checked by the first thread 411 might include whether key applications (e.g., a web server program or a data base) had been restarted since normal operation began and whether all of these applications appear to be getting scheduled reasonably.

Figure 5:
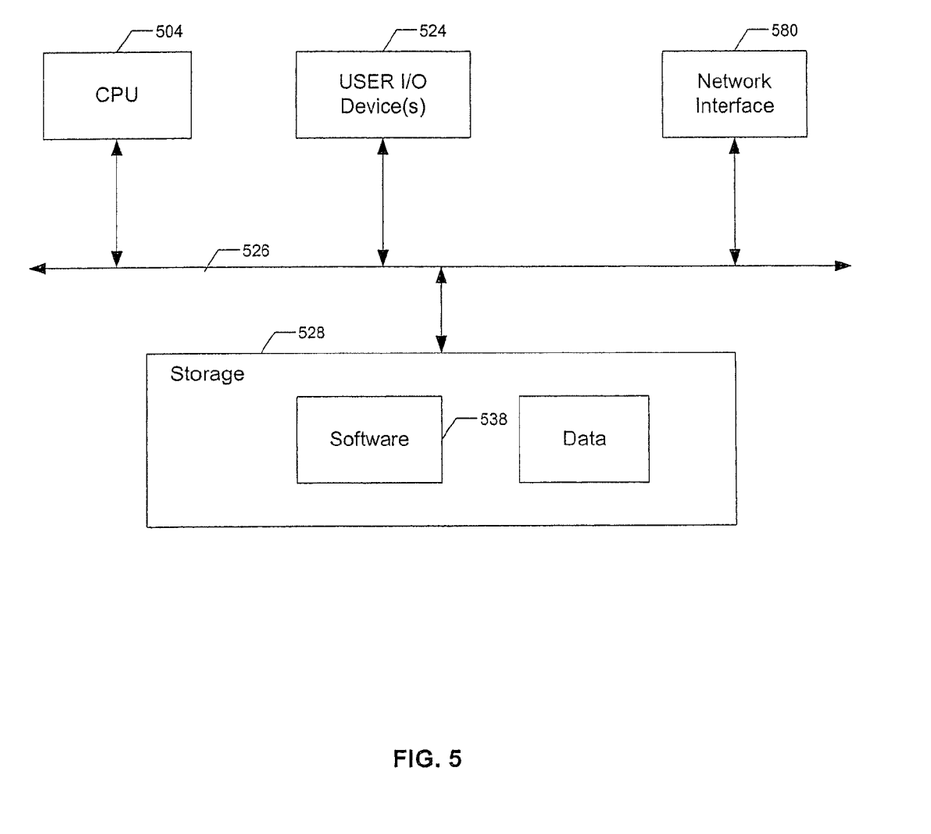
FIG. 5 is an illustration of a representative computer system.

FIG. 5 is an illustration of a representative computer system 500 that can be used to implement the computer systems described above. Computer system 500 includes a processor or central processing unit 504 capable of executing a conventional operating systems, including dual-kernel and real-time operating systems. Central processing unit 504 communicates with a set of one or more user input/output (I/O) devices 524 over a bus 526 or other communication path. The I/O devices 524 may include a keyboard, mouse, video monitor, printer, etc. The CPU 504 also communicates with a computer readable medium (e.g., conventional volatile or non-volatile data storage devices) 528 (hereafter "storage 528") over the bus 526. The interaction between CPU 504, I/O devices 524, bus 526, network interface 580, and storage 528 are well known in the art.

Storage 528 stores software 538. Software 538 may include one or more operating system and one or more software modules 540 for implementing the methods of the present invention. Conventional programming techniques may be used to implement software 538. Storage 528 can also store any necessary data files. In addition, computer system 500 may be communicatively coupled to the Internet and/or other computer network through a network interface 580 to facilitate data transfer and operator control.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

While the processes described herein have been illustrated as a series or sequence of steps, the steps need not necessarily be performed in the order described, unless indicated otherwise.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention. Obviously, numerous modifications and variations of the present invention are possible in light of the above teachings. It is therefore to be understood that the invention may be practiced otherwise than as specifically described herein.

Thus, the breadth and scope of the present invention should not be limited by any of the above-described exemplary embodiments, but should be defined only in accordance with the following claims and their equivalents.

What is claimed is:

1. A computer system, comprising:
a memory and a processor;
a general-purpose kernel running on the processor with a first configurable set of integrity markers and properties;
a real-time kernel running on the processor with a second configurable set of integrity markers and properties, the real-time kernel running a first security process, a second security process, and one or more challenge handlers, the first security process having a third configurable set of integrity markers and properties, the second security process having a fourth configurable set of integrity markers and properties;
the first security process configured to periodically check the first configurable set of integrity markers and properties;
the second security process configured to periodically check the first configurable set of integrity markers and properties and to periodically check the third configurable set of integrity markers and properties;
the one or more challenge handlers configured to provide challenge/response functionality when challenges are received from a monitor; and
a security module running under the general-purpose kernel configured to periodically check the second configurable set of integrity markers and properties, to periodically check the third configurable set of integrity markers and properties, and periodically check the fourth configurable set of integrity markers.

2. The computer system of claim 1 wherein the integrity markers include a checksum or digital signature.

3. The computer system of claim 1 wherein the integrity markers in the first configurable set include whether an application has been restarted.

4. The computer system of claim 1 wherein the integrity markers in the first configurable set include whether an application appears to be normally scheduled.

5. The computer system of claim 1 wherein the monitor is an external device which expects a challenge response within a specified time.

6. The computer system of claim 1 wherein the monitor is an internal device.

7. In a computer system running a real-time operating system, a computer security method, comprising:
executing a first security process under a real-time kernel, wherein the first security process is configured to periodically check a first configurable set of integrity markers and properties of a general-purpose kernel, and wherein the real-time kernel has a second configurable set of integrity markers and properties;
executing a second security process under the real-time kernel, wherein the second security process is configured to periodically check the first configurable set of integrity markers and properties and to periodically check a third configurable set of integrity markers and properties of the first security process;

executing one or more challenge handlers under the real-time kernel, wherein the one or more challenge handlers are configured to provide challenge/response functionality when challenges are received from a monitor; and executing a security module under the general-purpose kernel, wherein the security module is configured to periodically check the second configurable set of integrity markers and properties, to periodically check the third configurable set of integrity markers and properties, and to periodically check a fourth configurable set of integrity markers and properties of second security process.

8. The computer security method of claim 7 wherein the integrity markers include a checksum or digital signature.

9. The computer security method of claim 7 wherein the integrity markers in the first configurable set include whether an application has been restarted.

10. The computer security method of claim 7 wherein the integrity markers in the first configurable set include whether an application appears to be normally scheduled.

11. The computer security method of claim 7 wherein the monitor is an external device which expects a challenge response within a specified time.

12. The computer security method of claim 7 wherein the monitor is an internal device.

13. A computer system, comprising:
a memory and a processor;
a dual-kernel operating system comprising a real-time kernel running on the processor and a general-purpose kernel running on the processor, wherein the general-purpose kernel has a first configurable set of integrity markers and properties and the real-time kernel has a second configurable set of integrity markers and properties;

a first real-time thread executing under the real-time kernel with a third configurable set of integrity markers and properties, the first real-time thread configured to periodically check the first configurable set of integrity markers and properties;

a second real-time thread executing under the real-time kernel with a fourth configurable set of integrity markers and properties, the second real-time thread configured to periodically check the first configurable set of integrity markers and properties and to periodically check the third configurable set of integrity markers and properties;

one or more challenge handlers executing under the real-time kernel configured to provide challenge/response functionality when challenges are received from a monitor; and a security module executing under the general-purpose kernel configured to periodically check the second configurable set of integrity markers and properties, to periodically check the third configurable set of integrity markers and properties, and to periodically check the fourth configurable set of integrity markers and properties.

14. The computer system of claim 13 wherein the integrity markers include a checksum or digital signature.

15. The computer system of claim 13 wherein the integrity markers in the first configurable set include whether an application has been restarted.

16. The computer system of claim 13 wherein the integrity markers in the first configurable set include whether an application appears to be normally scheduled.

17. The computer system of claim 13 wherein the monitor is an external device which expects a challenge response within a specified time.

18. The computer system of claim 13 wherein the monitor is an internal device.

* * * * *